(12) United States Patent
Priyadarshi et al.

(10) Patent No.: US 7,780,465 B2
(45) Date of Patent: Aug. 24, 2010

(54) POWERED LATCHING MECHANISM FOR A MODULE

(75) Inventors: Sunil Priyadarshi, Sunnyvale, CA (US); Joshua Moore, Sunnyvale, CA (US)

(73) Assignee: Finisar Corporation, Sunnyvale, CA (US)

( * ) Notice: Subject to any disclaimer, the term of this patent is extended or adjusted under 35 U.S.C. 154(b) by 6 days.

(21) Appl. No.: 12/113,768

(22) Filed: May 1, 2008

(65) Prior Publication Data

US 2009/0275230 A1    Nov. 5, 2009

(51) Int. Cl.
*H01R 13/627* (2006.01)

(52) U.S. Cl. .................... 439/352; 385/92; 361/679.31

(58) Field of Classification Search ............ 361/679.31; 385/92; 439/352

See application file for complete search history.

(56) References Cited

U.S. PATENT DOCUMENTS

| 5,959,834 | A  * | 9/1999 | Chang ................... 361/679.31 |
| 7,234,880 | B1 * | 6/2007 | Charny et al. .................. 385/92 |

* cited by examiner

*Primary Examiner*—Truc T Nguyen
(74) *Attorney, Agent, or Firm*—Workman Nydegger

(57) ABSTRACT

A latching system for use in selectively securing a module within a receptacle of a host device is described. In one or more examples, the latching system includes a powered actuation mechanism and a latching mechanism. In one or more examples, the module latching mechanism includes a latch and the powered actuation mechanism disengages a latch from a catch. In one or more examples, two latches are provided. In one or more examples, the latching mechanism of a module includes a pusher that interacts with a latch located on a receptacle. In one or more examples, a module includes two latches.

18 Claims, 16 Drawing Sheets

POWERED LATCHING MECHANISM FOR A MODULE

BACKGROUND

Modules, such as electronic or optoelectronic transceiver or transponder modules, are increasingly used in electronic and optoelectronic communication. Some modules are pluggable, which permits the module to be inserted and removed from a receptacle of a host device, such as a host computer, switching hub, network router, or switch box. Some host devices include multiple receptacles and can therefore accommodate multiple modules simultaneously. Each module may communicate with host circuitry by transmitting and/or receiving electrical signals to and/or from the host circuitry. These electrical signals may be transmitted by the module outside the host device as optical and/or electrical signals. In order for a module to be pluggable, various latching mechanisms have been developed to secure modules within host device receptacles and to release modules from within host device receptacles.

BRIEF SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some principles disclosed herein relate to a module that comprises a body, configured to allow at least partial insertion of the module into a receptacle of a host device. The example module also comprises a latching mechanism, disposed on or in the body, configured to secure the module to the receptacle in an operating position with respect to the receptacle. The example module also comprises a host-side communications interface, disposed on or in the body, configured to be capable of communicating with the host device at least when the module is in the operating position. The example module also comprises an external communications interface, disposed on or in the body, configured to be capable of sending communication outside the host device, receiving communication from outside the host device, or both. The example module also comprises a powered actuation mechanism, disposed on or in the body, configured to actuate the latching mechanism. Finally, the example module also comprises module circuitry, disposed on or in the body, configured to supply an electrical input to the powered actuation mechanism, thereby actuating the latching mechanism, and further configured to carry information between the host-side communications interface and the external communications interface.

Some principles disclosed herein relate to a host device that may comprise a receptacle, configured to accept a module. The host device may also comprise host circuitry, configured to provide an unlatching signal to the module.

Some principles disclosed herein relate to a module that comprises a body, configured to allow at least partial insertion of the module into a receptacle of a host device. The module also comprises a host-side communications interface, disposed on or in the body, configured to be capable of communicating with the host device at least when the module is in an operating position. The module also comprises an external communications interface, disposed on or in the body, configured to be capable of sending communication outside the host device, receiving communication from outside the host device, or both. The module also comprises a means for latching the module into the receptacle of the host device in the operating position. Finally, the module also comprises means for disengaging the latching means in response to an unlatching signal provided to the module by the host device.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Examples disclosed herein generally relate to a latching mechanism that releasably secures a module within a receptacle of a host device. Some of the examples may include a powered actuation mechanism that may secure or release a module from the receptacle. Some of the examples may prevent removal of the module without an encoded signal being delivered to the module.

For purposes of adequate description of the following examples, this document may refer to various directions. These directions are for purposes of describing various attributes of particular examples and are not intended to be limiting. Any of these examples may be implemented in other orientations. Axes indicating reference directions are included in various figures, and are to be presumed attached to the receptacle unless otherwise indicated explicitly or required by context (see, for example, FIG. 1, axes 10). Movement or force in the positive x-direction may herein be referred to as "forward". Movement or force in the negative x-direction may herein be referred to as "backward". Movement or force in the positive y-direction may herein be referred to as "leftward". Movement or force in the negative y-direction may be referred to as "rightward". Movement or force in the positive z-direction may herein be referred to as "upward". Movement or force in the negative z-direction may herein be referred to as "downward".

EXAMPLE 1

Figure 1:
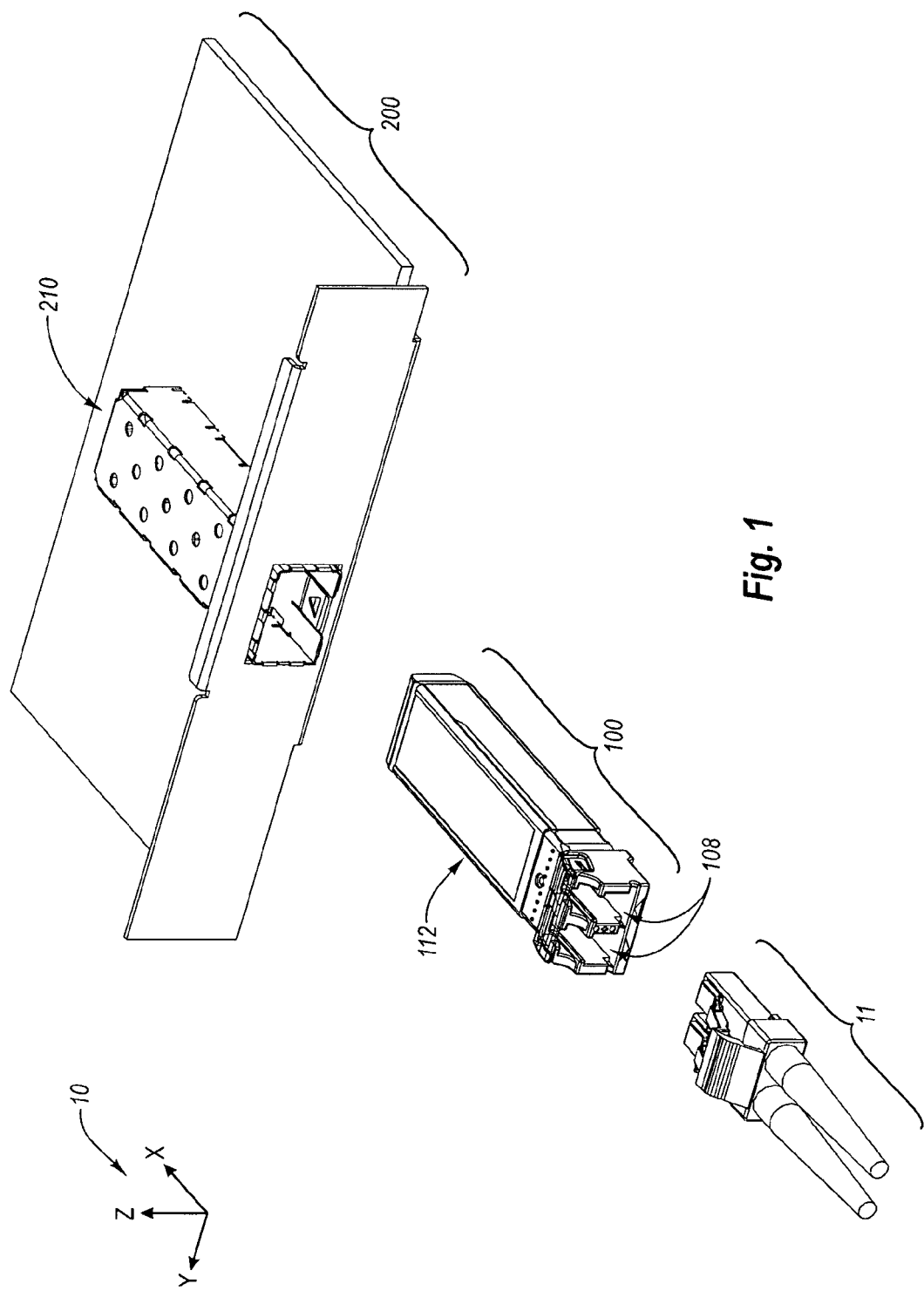
FIG. 1 is a perspective view of an example module, an example host device, and two example optical cables.

FIG. 1 shows module 100 and a portion of host device 200, comprising receptacle 210. Module 100 may be a transceiver that is substantially compliant with the SPF+, SFF, or XFP standardization agreement, although other standards are contemplated. Module 100 may comprise body 112, configured so as to allow at least partial insertion of module 100 into receptacle 210. Thus, module 100 may be insertable into receptacle 210, securable therein, and extractable therefrom. Module 100 may be configured to accept one or more optical cables 11 into cable ports 108. One function of module 100 may be conversion of electrical signals from host device 200 to optical signals that may be transmitted out through one or more optical cables 11. Another function of module 100 may be conversion of optical signals from on or more optical cables 11 to electrical signals which may be transmitted to host device 200. Host device 200 may be any of many types. For instance, host device 200 may be a host computer, a switching hub, a network router, a network attach storage device, or any other suitable device. In some applications, like switching hubs, host device 200 may typically include many receptacles like receptacle 210. Axes 10 may define directions with respect to receptacle 210.

Figure 2:
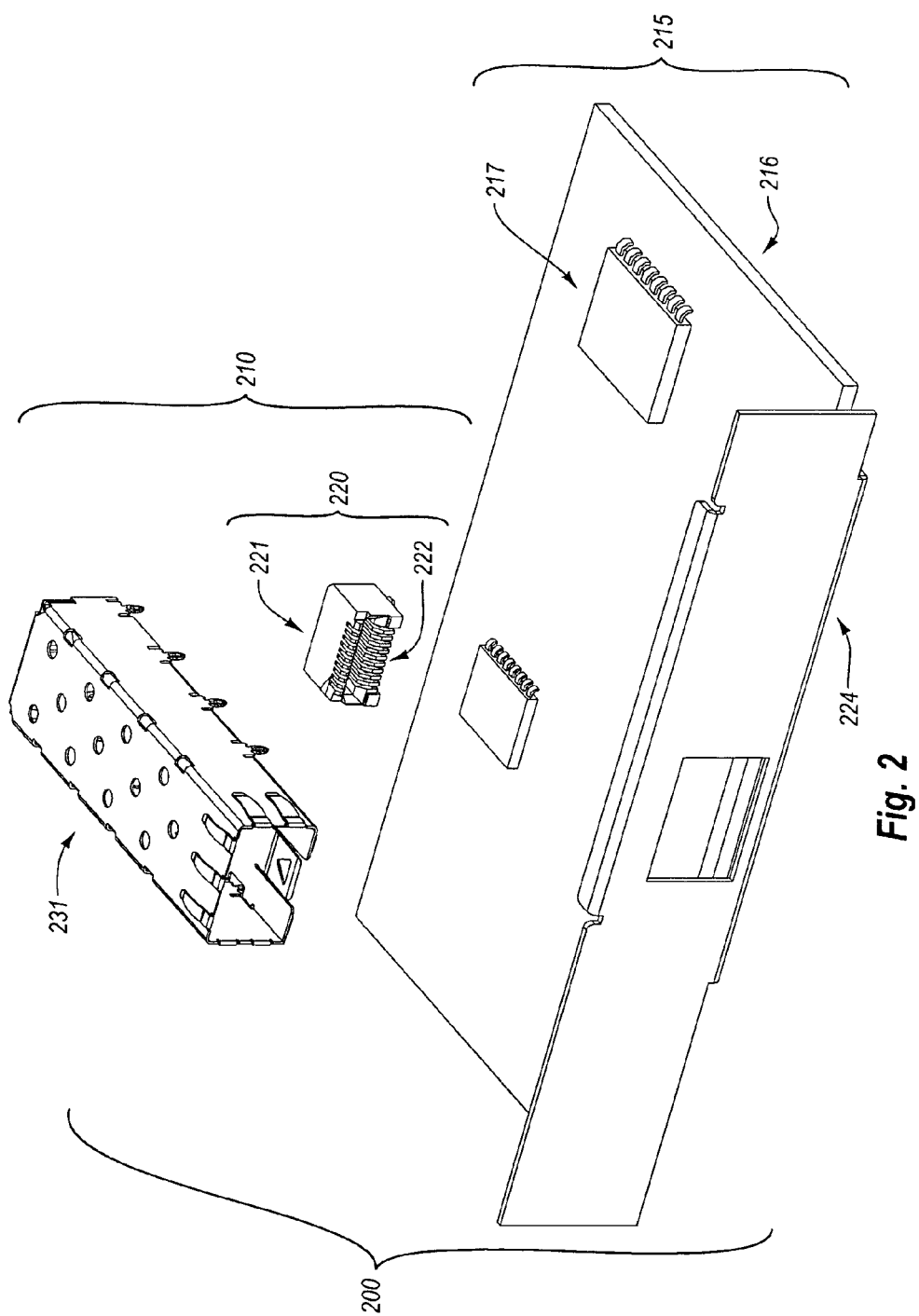
FIG. 2 is a perspective view of an example host device.

FIG. 2 shows an exploded detail of host device 200, including receptacle 210. Receptacle 210 may comprise receptacle cage 231 and receptacle communications interface 220. Receptacle cage 231 may be a sheet metal form and may be sized and shaped so as to enable a person to insert module 100 therein. Receptacle cage 231 may be made of a sheet metal, for example, stainless steel, or may be made of any other suitable material. Optionally, receptacle cage 231 may be molded from plastic or other suitable materials. Receptacle communications interface 220 comprises connector body 221 and compliant conductors 222. Receptacle communications interface 220 may operate as, among other things, a means to enable communication between host device 200 with module 100 in a way to be explained in further detail below. Host 210 also may comprise host circuitry 215, which may comprise PCB 216 and associated host processing components 217. Finally, host 210 may comprise faceplate 224, which may be shared with other receptacles.

Figure 3:
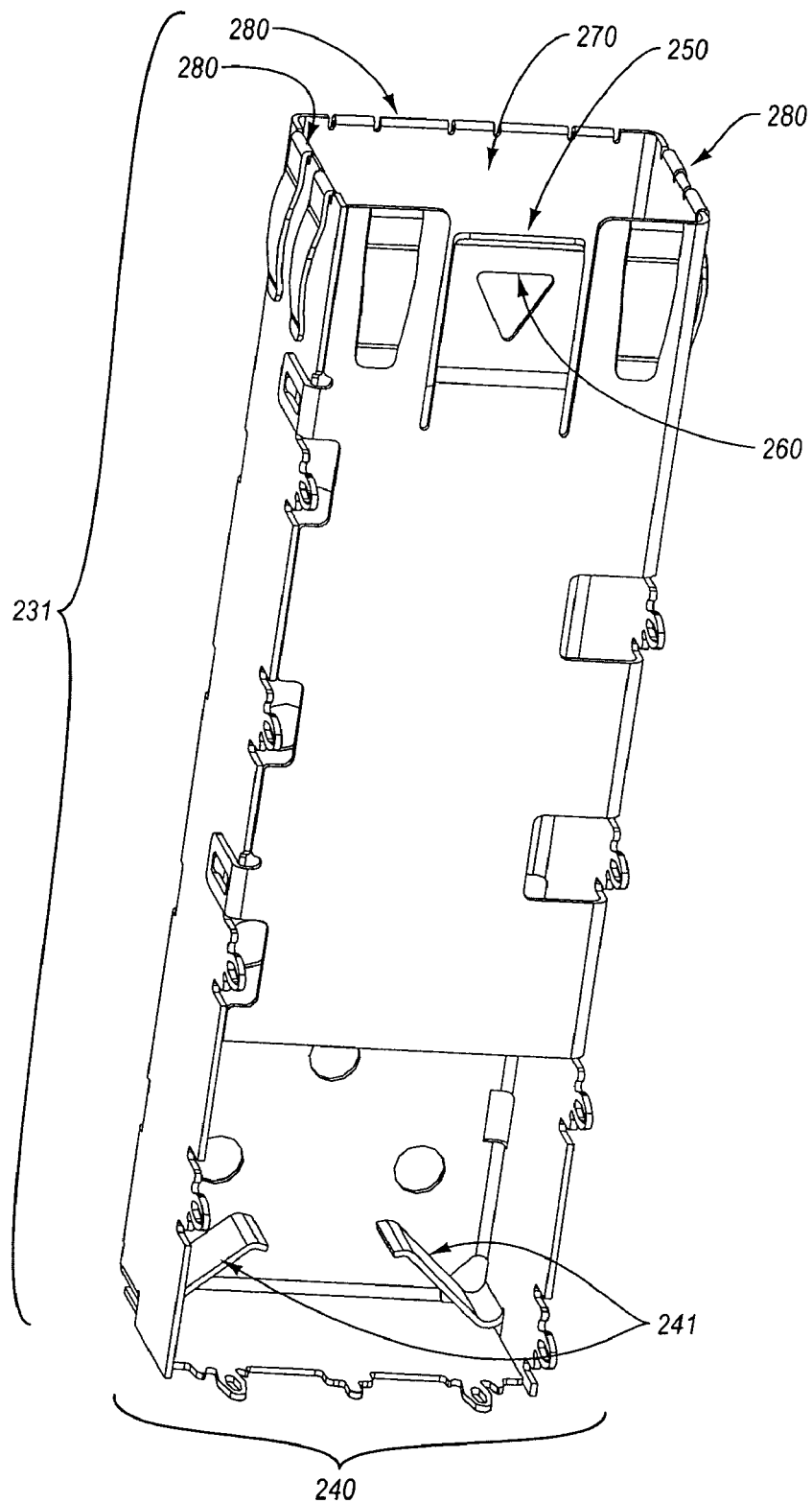
FIG. 3 is a bottom perspective view of an example receptacle.

FIG. 3 shows a detailed view of the bottom of receptacle cage 231. Receptacle cage 231 may comprise lip 250 and catch 260, the function thereof to be clarified below. Receptacle cage 231 may comprise receptacle opening 270, sized so as to allow insertion of module 100. In the forward most part of receptacle cage 231 (bottom of FIG. 3), receptacle cage 231 may comprise eject mechanism 240, here comprising two leaf springs 241. The function of eject mechanism 240 will be explained below.

Figure 4:
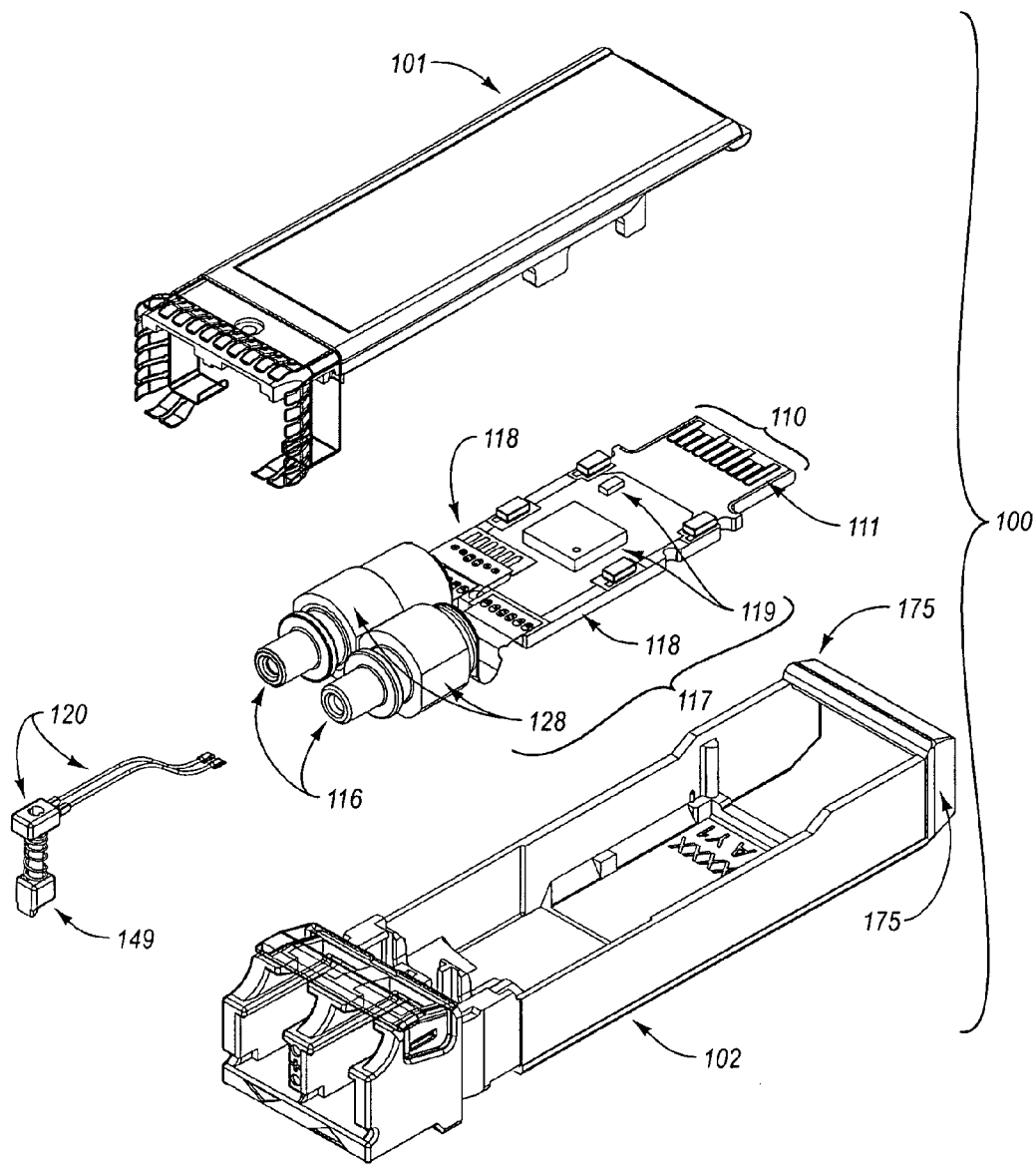
FIG. 4 is a perspective exploded view of an example module.

FIG. 4 shows an exploded isometric view of module 100. Module 100 may comprise body 112, comprising top shell 101 and bottom shell 102, fastened together by any suitable means, including screws, clasps, collars, adhesive, etc. Body 112 may be configured so as to allow at least partial insertion of module 100 into receptacle 210.

Module 100 may be configured with host-side communications interface 110, here comprising PCB pads 111. When module 100 is secured in receptacle 210, host-side communications interface 110 may couple to receptacle interface 220 (FIG. 2), thereby allowing electrical communication to pass between module 100 and host device 200. Specifically, PCB pads 111 may be brought into contact with complaint conductors 222, allowing electrical signals to pass therebetween. Thus, host-side communications interface 110 may operate as, among other things, a means for electrically coupling module 100 to host device 200.

Module 100 may be configured with an external communications interface 116, here comprising the optical interface of optical subassemblies 128. Module 100 may receive optical signals from one or more optical cables 11 (FIG. 1) at one or more of the optical interfaces. Module 100 may transmit optical signals into one or more optical cables 11 from one or more of the optical interfaces. Thus, external communications interface 116 may operate as, among other things, a means for communicating outside of host device 200.

Module 100 may also be configured with module circuitry 117, here comprising printed circuit board 118, optical subassemblies 128, and other associated components 119. Module circuitry 117 may be configured to perform various functions including carrying information between host-side communications interface 110 and external communications interface 116. In addition, module circuitry 117 may be configured to supply an electrical input to a powered actuation mechanism 120, to be described in detail below. Thus, module circuitry 117 may operate as, among other things, a means for powering the powered actuation mechanism and a means for carrying information between the host-side communications interface and the external communications interface. Optical subassemblies 128 may convert electrical signals to optical signals or vice versa. Thus, module circuitry 117 may operate as, among other things, a means for converting information signals from one form into another.

Module 100 may comprise latching mechanism 149 and powered actuation mechanism 120. Latching mechanism 149, when interoperating with specific elements of receptacle 210, may provide a means for securing the module into receptacle 210 in an operating position with respect to receptacle 210. Powered actuation mechanism 120 may operate to release latching mechanism 149. Both components and their function will be described in greater detail below.

Figure 5:
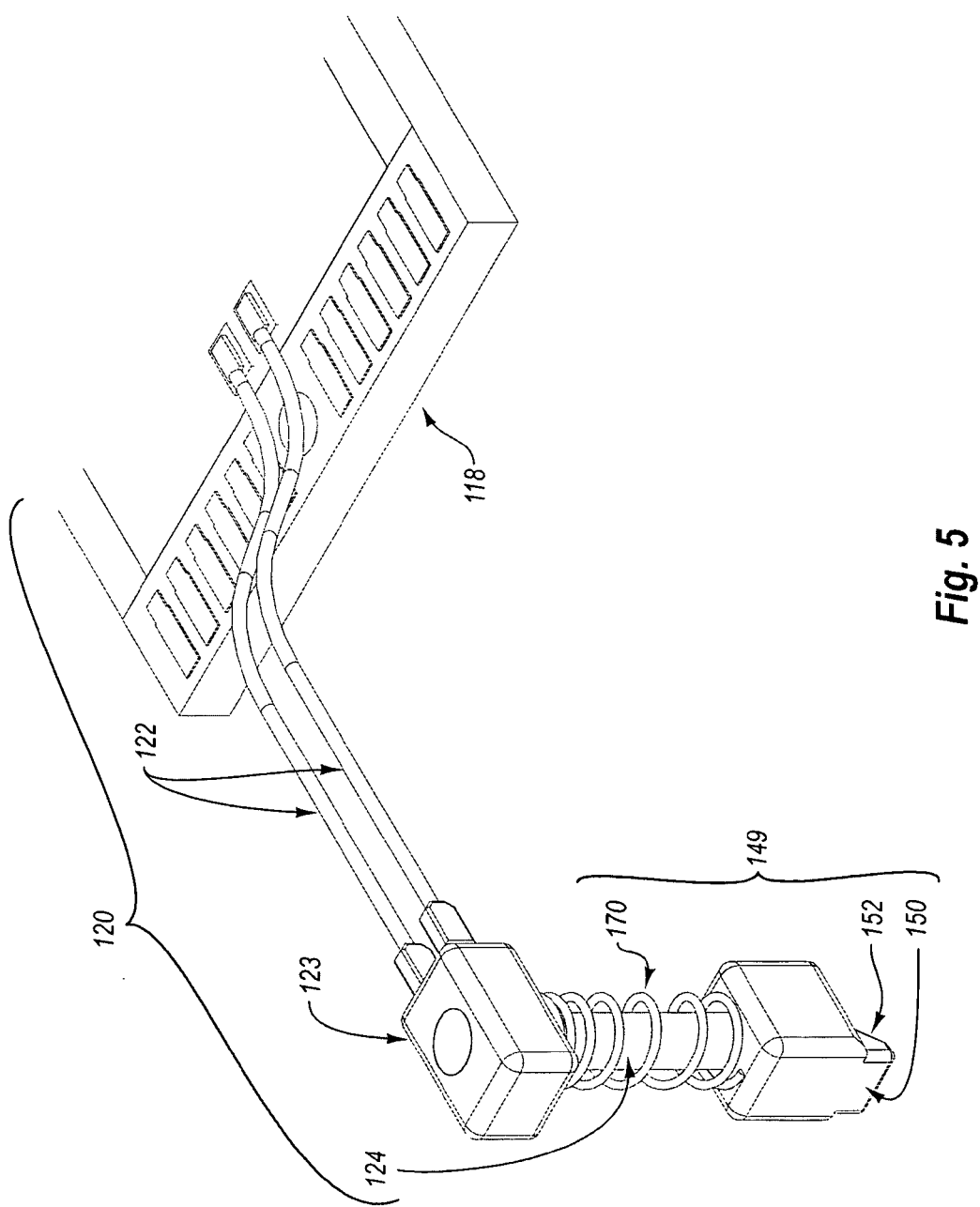
FIG. 5 is a perspective view of an example latching mechanism and an example powered actuation mechanism.
Figure 6:
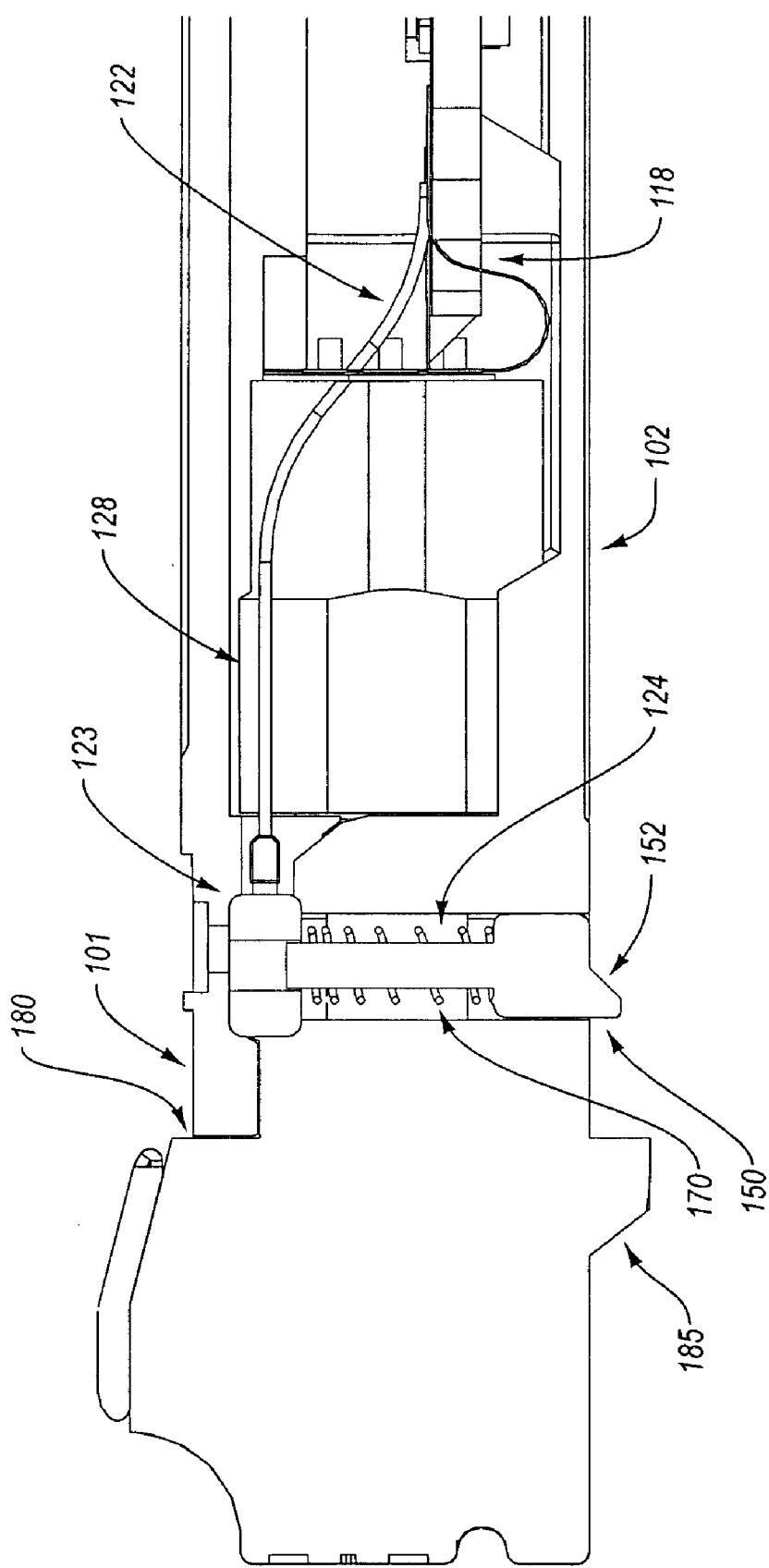
FIG. 6 is a section view of an example module showing an example latching mechanism and an example powered actuation mechanism.

FIG. 5 shows, among other things, a detailed view of latching mechanism 149. FIG. 6 shows a cross section of module 100. Referring to both figures, latching mechanism 149 may comprise a latch spring 170 and latch 150. Latch spring 170 may be compressed between solenoid stator 123 and latch 150, biasing latch 150 downward towards bottom shell 102. That is, latch spring 170 may operate as, among other things, a means for biasing latch 150 towards the latched position. When no outside force acts on latch 150 and solenoid stator 123 is not powered, latch spring 170 may cause a portion of latch 150 to bear onto bottom shell 102, preventing latch 150 from being ejected from the module 100. Latch 150 may be cast of zinc, molded from a polymer, or made any other suitable way.

FIGS. 5 and 6 also both show powered actuation mechanism 120, comprising solenoid stator 123, solenoid plunger 124, and connection leads 122. Solenoid stator 123 may be affixed to top shell 101 by epoxy, any suitable adhesive, a fastener, or any other suitable manner. Latch 150 may be provided with a hole in which plunger 124 is inserted. Plunger 124 may be connected to latch 150 by adhesive, or any other suitable means including, but not limited to, screw threads and soldering. Plunger 124 may be made of iron, or any other suitable material. Powered actuation mechanism 120 may be configured as a means for actuating the latching mechanism, in a way described below.

With particular reference to FIGS. 7 through 10 and continued reference to FIGS. 5 and 6, the interaction of the components of module 100 and receptacle 210 during insertion of module 100 will now be described. FIGS. 7 through 10 show four cross-sections of a portion of powered actuation mechanism 120, latching mechanism 149, lip 250, and catch 260. Each cross section represents a different point during insertion of module 100 into receptacle 210. The act of insertion may begin with module 100 outside receptacle 210. The first stage of insertion may begin as module 100 is generally translated forward towards receptacle opening 270. Module 100 may comprise ramp features 175 (FIG. 4) which may align the forward portion of module 100 in receptacle opening 270. In this way ramp features 175 may operate as, among other things, a means to align the front portion of module 100. As module 100 continues to be inserted, receptacle cage 231 may substantially align module 100. Thus, receptacle cage 231 may operate as, among other things, a means for guiding the module into the receptacle in a way that results in module 100 reaching an operating position.

Continued forward translation may cause module 100 to contact ejection mechanism 240, comprising leaf springs 241 (see FIG. 3). Leaf springs 241 may initially be in the free position before any module 100 is inserted. Leaf springs 241 may be integrally formed from the material of receptacle cage 231. Or, optionally, leaf springs 241 may be provided as a part separate from receptacle cage 231. Continued forward translation of module 100 may deform leaf springs 241, thereby imparting a backwards force resisting insertion.

Figure 7:
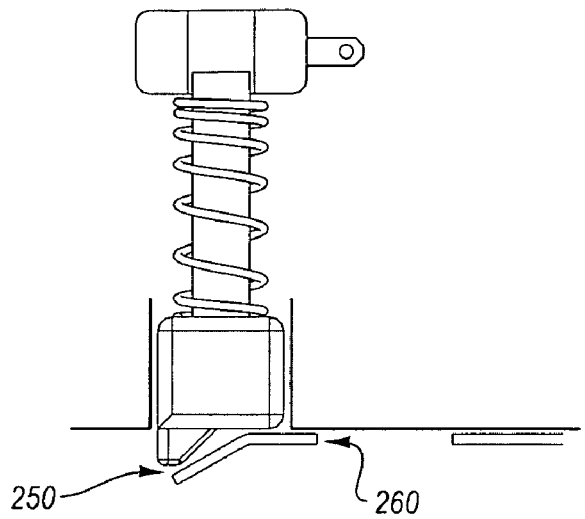
FIG. 7 is a side view of an example powered actuation mechanism and an example latching mechanism in the free state.
Figure 8:
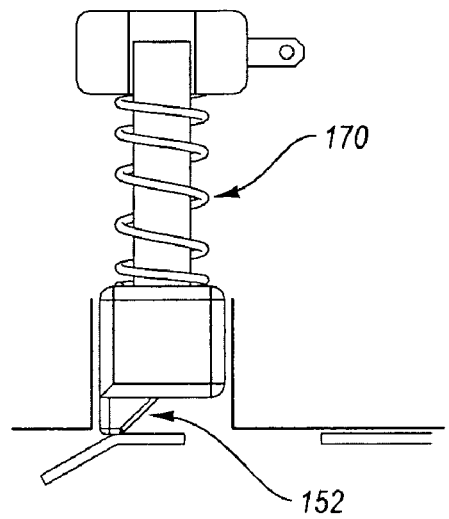
FIG. 8 is a side view of an example powered actuation mechanism and an example latching mechanism in a state in which the latch is being depressed by a portion of the receptacle.

Continued insertion of module 100 into receptacle 210 may cause lip 250 of receptacle 210 to contact with latch ramp 152, as shown in FIG. 7. Lip 250 may be provided as an integral part of receptacle cage 231, as shown in FIG. 3, or, optionally, may be provided as a separate piece. Continued insertion may cause lip 250 to bear against latch ramp 152, thereby forcing latch 150 to translate up with respect to module 100, thereby compressing latch spring 170 as shown in FIG. 8. In this way, lip 250 may operate as, among other things, a means to depress latch 150 during insertion.

Figure 9:
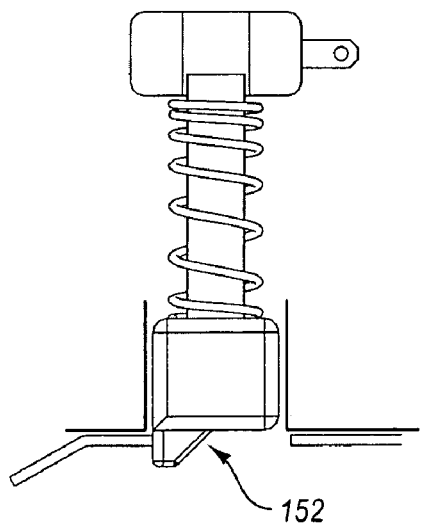
FIG. 9 is a side view of an example powered actuation mechanism and an example latching mechanism in a latched state.

Further translation brings module 100 to an operating position, where latch 150 may travel past catch 260, as shown in FIG. 9. A module may be in the operating position when it is able to communicate with the host device and it is secured within the receptacle. Catch 260 may be provided as an integral part of receptacle cage 231, as shown here, or, optionally, may be provided as a separate piece. Catch 260 may be configured as a hole through a portion of receptacle 210, as shown in FIG. 3, but may also be configured in other ways suitable for engaging any particular latch. At the operating position, latch 150 may translate downward with respect to module 100 until latch 150 comes to rest bearing against bottom shell 102, thereby latching module 100 to receptacle 210, as shown in FIG. 9.

Figure 10:
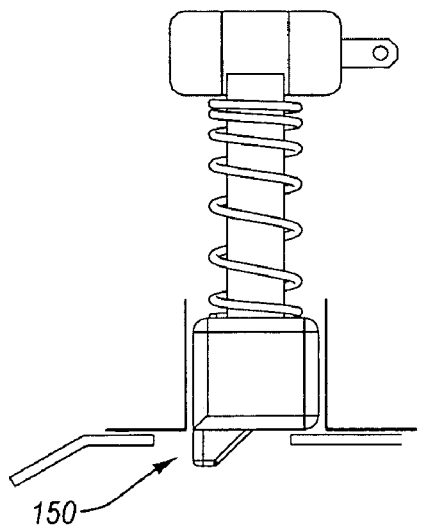
FIG. 10 is a side view of an example powered actuation mechanism and an example latching mechanism in an over-travel position.

Continued forward translation of the module may cause module 100 to translate to an over-travel position (as shown in FIG. 10), where module insertion stop 180 (FIG. 6) may contact receptacle insertion stop 280 (FIG. 3), thereby preventing further insertion. Module 100 and receptacle 210 may be configured with the over-travel position far enough past the operating position to ensure that in all tolerance conditions it is always possible to insert module 100 far enough into receptacle 210 for latch 150 to pass catch 260.

Removing insertion force at any position beyond the operating position may cause ejection spring 241 to move module 100 backwards to the operating position, at which point ejection spring 241 may bias latch 150 onto catch 260. Thus, ejection mechanism 240 may be configured to operate as, among other things, a means for biasing latch 150 into catch 260. Catch 260 may be configured to engage latch 150 when module 100 is in an operating position with respect to receptacle 210. Thus, catch 260 may operate as, among other things, a means of engaging a latch, thereby securing a module into a receptacle.

At some point during insertion before module 100 reaches the operating position, module interface 110 may electrically couple to receptacle communications interface 220. The pair may remain electrically coupled through the portion of insertion travel that at least includes the operating position.

Anti-tamper feature 185 (FIG. 6) comprises a protrusion of bezel of the module. Anti-tamper feature 185 may operate as, among other things, a means to prevent manual unlatching of the latch from the outside of the host device by blocking the insertion of a tool into the space between receiving cavity 270 and module 100. The anti-tamper feature may be any suitable shape that prevents insertion of a tool that might unlatch the latch from the catch.

Module 100 may be ejected from receptacle 210. To perform an ejection, module circuitry 117 may deliver an electrical input to powered actuation mechanism 120. In particular, module circuitry 117 may deliver electrical current to solenoid stator 123, thereby imparting an upward actuation force to solenoid plunger 124. Starting from the latched position, the actuation force may thus move latch 150 upward. As latch 150 disengages from catch 260, ejection spring 241 may at least partially eject module 100 from receptacle 210. Thus, powered actuation mechanism 120 may operate as, among other things, a means for disengaging latching mechanism 149. Ejection mechanism 240 may operate as, among other things, a means for at least partially ejecting module 100 from receptacle 210. From the partially ejected position, module 100 may then be removed from receptacle 210 by manually translating module 100 backwards.

EXAMPLE 2

Figure 11:
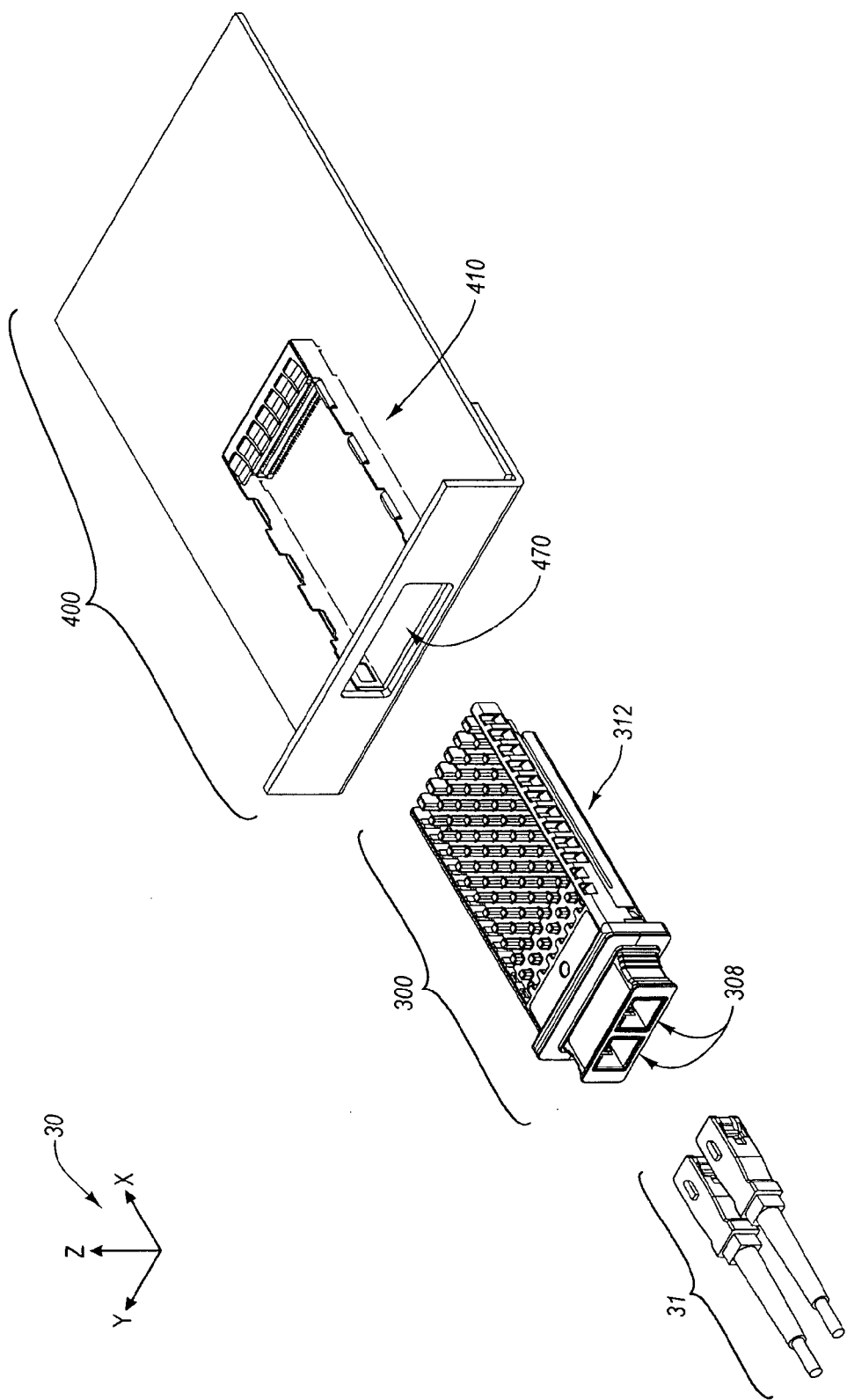
FIG. 11 is a perspective view of an example module, an example host device, and example optical cables.

FIG. 11 shows module 300 and a portion of host device 400, comprising receptacle 410. Module 300 may be a transceiver that is substantially compliant with an X2 or XFP multi-source agreement, although other multi-source agreements are contemplated. Module 300 may comprise body 312, configured so as to allow at least partial insertion of module 300 into receptacle 410. Thus, module 300 may be insertable into receptacle 410, securable therein, and extractable therefrom. Module 300 may be configured to accept one or more optical cables 31 into cable ports 308. One function of module 300 may be conversion of electrical signals from host device 400 to optical signals that may be transmitted out through optical cables 31. Another function of module 300 may be conversion of optical signals from on or more optical cables 31 to electrical signals which may be transmitted to host device 400. Host device 400 may be any of many types. For instance, host device 400 may be a host computer, a switching hub, a network router, a network attach storage device, or any other suitable device. In some applications, like switching hubs, host device 400 may typically include many receptacles like receptacle 410. Axes 30 may define various directions with respect to receptacle 410.

Figure 12:
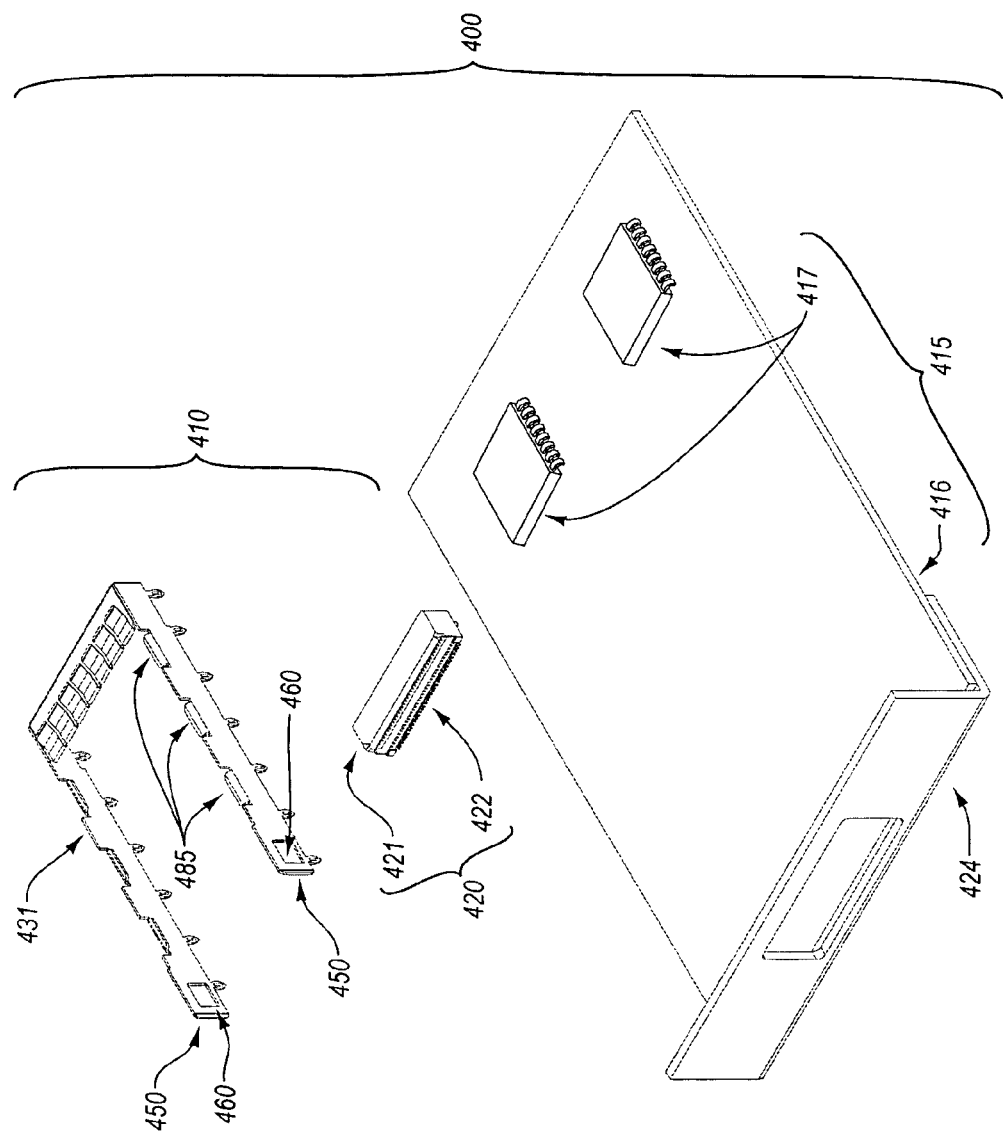
FIG. 12 is an exploded view of an example host device.

FIG. 12 shows an exploded detail of host device 400, including receptacle 410. Receptacle 410 may comprise receptacle cage 431 and receptacle communications interface 420. Receptacle cage 431 may be a sheet metal form and may be sized and shaped so as to enable a person to insert module 300 therein. Receptacle cage 431 may be made of a sheet metal, for example, steel, or may be made of any other suitable material. Optionally, receptacle cage 431 may be molded from plastic, zinc, or other suitable materials. Receptacle cage 431 may comprise lip 450 and catch 460, the function thereof to be clarified below. Receptacle communications interface 420 comprises connector body 421 and compliant conductors 422. Receptacle communications interface 420 may operate as, among other things, a means to enable communication between host device 400 with module 300 in a way to be explained in further detail below. Host 410 may also comprise host circuitry 415, which may comprise PCB 416 and associated host processing components 417. Finally, host 410 may comprise faceplate 424, which may be shared with other receptacles.

Figure 13:
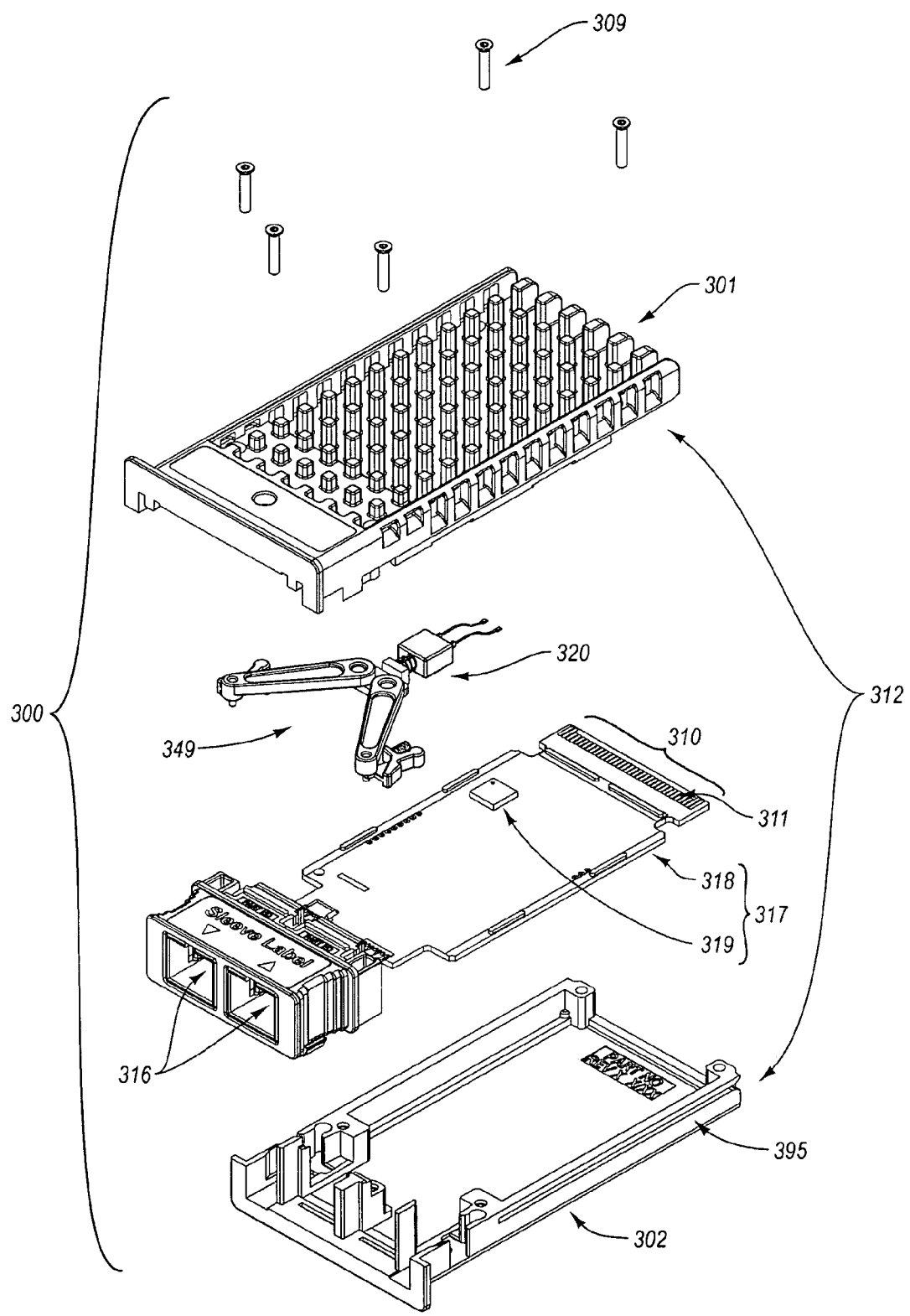
FIG. 13 is an exploded view of an example module.

FIG. 13 shows an exploded isometric view of module 300. Module 300 may comprise body 312, comprising top shell 301 and bottom shell 302, fastened together by screws 309 or any suitable means, including, clasps, collars, adhesive, etc. Body 312 may be configured so as to allow at least partial insertion of module 300 into receptacle 410.

Module 300 may be configured with host-side communications interface 310, here comprising PCB pads 311. When module 300 is secured in receptacle 410, host-side communications interface 310 may couple to receptacle interface 420 (FIG. 12), thereby allowing electrical communication to pass between module 300 and host device 400. Specifically, PCB pads 311 may be brought into contact with complaint conductors 422, allowing electrical signals to pass therebetween. Thus, host-side communications interface 310 may provide a means for electrically coupling module 300 to host device 400.

Module 300 may be configured with an external communications interface 316, here comprising the optical interface of the optical subassemblies of module 300. Module 300 may receive optical signals from one or more optical cables 31 (FIG. 11) at one or more of the optical interfaces. Module 300 may transmit optical signals into one or more optical cables 31 from one or more of the optical interfaces. Thus, external communications interface 316 may operate as, among other things, a means for communicating outside of host device 400.

Module 300 may also be configured with module circuitry 317, here comprising printed circuit board 318 and other associated components 319. Module circuitry 317 may be configured to perform various functions including carrying information between host-side communications interface 310 and external communications interface 316. In addition, module circuitry 317 may be configured to supply an electrical input to powered actuation mechanism 320, to be described in detail below. Thus, module circuitry 317 may operate as, among other things, a means for powering the powered actuation mechanism and a means for carrying information between the host-side communications interface and the external communications interface. Optical subassemblies (not shown) may convert electrical signals to optical signals or vice versa. Thus, module circuitry 317 may operate as, among other things, a means for converting information signals from one form into another.

Module 300 may also comprise latching mechanism 349 and powered actuation mechanism 320. Latching mechanism 349 may operate as, among other things, a means to secure module 300 to receptacle 410. Powered actuation mechanism 320 may operate as, among other things, a means to release latching mechanism 349. Both components and their function will be described in greater detail below.

Figure 14:
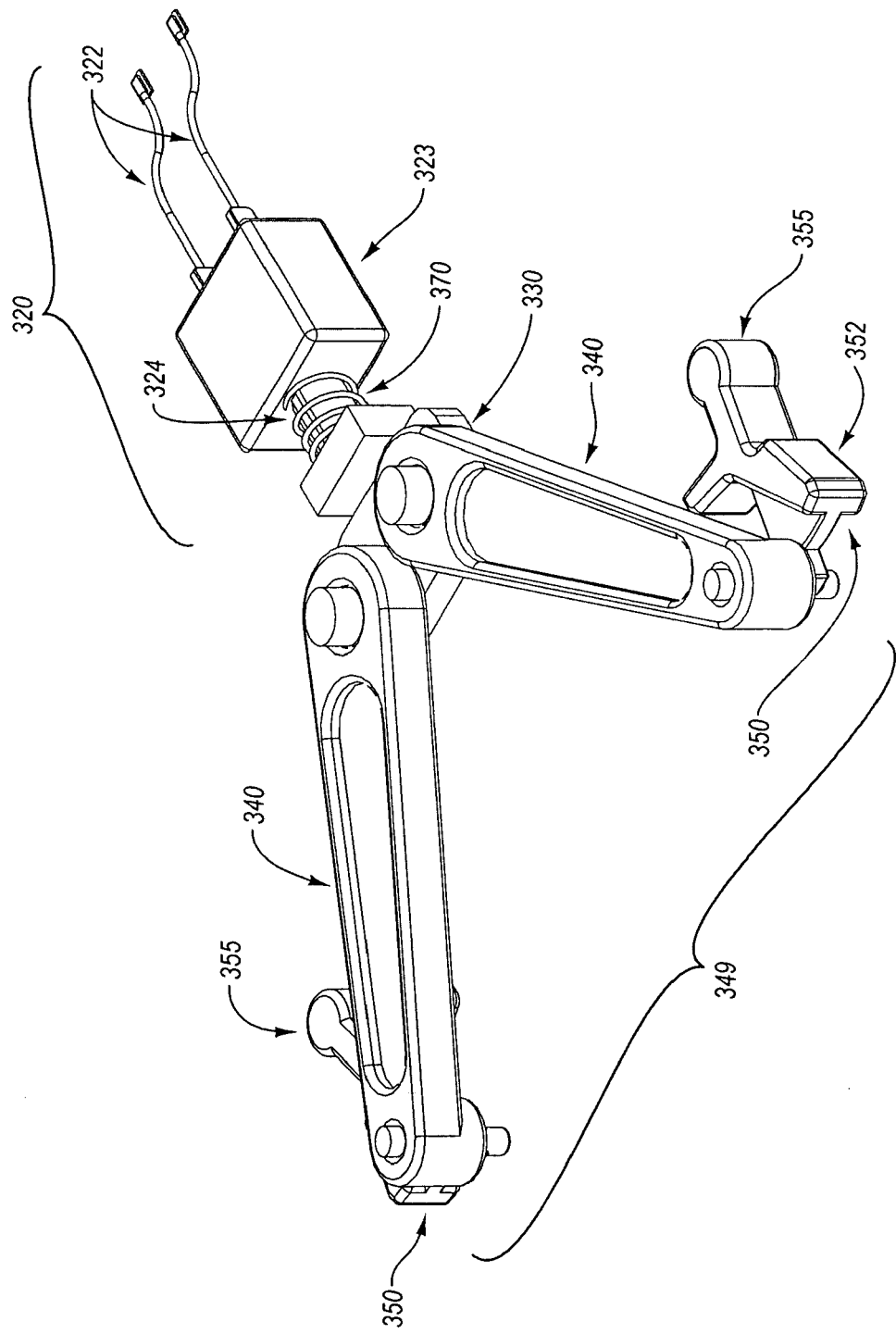
FIG. 14 is a detailed view of an example powered actuation mechanism and an example latching mechanism.

FIG. 14 shows a detailed view of latching mechanism 349 and powered actuation mechanism 320. Latching mechanism 349 and powered actuation mechanism 320 cooperate to selectively secure module 300 in receptacle 410, in a way to be described in detail below. Additionally, latching mechanism 349 and powered actuation mechanism 320 may cooperate to release module 300 from receptacle 410 so that it may be removed.

Latching mechanism 349 comprises latches 350, arms 340, link block 330, and latch spring 370. Latches 350 may cooperate with catches 460 (FIG. 12) to selectively latch module 300 into receptacle 410, in a way to be described in detail below. Latches 350 may rotatably couple to bottom shell 302 by latch pivot 355. Top shell 301 and bottom shell 302 constrain latches 350 along the latch pivot axis.

Arms 340 may mechanically couple latches 350 to link block 330. Each arm 340 contains two holes, one at each end. These holes slide over posts located on latch 350 and link block 330, respectively. Arms 340 may be cast of zinc, molded of polymer, or made in any other suitable manner. Arms 340 are constrained along the z-axis by link block 330 and latch 350 from below and top shell 301 from above.

Powered actuation mechanism 320 comprises solenoid stator 323, solenoid plunger 324, and connection leads 322. Solenoid stator 323 may be affixed to PCB 318 (FIG. 10). Connection leads 322 may electrically connect solenoid stator 323 to PCB 318. Solenoid plunger 324 may be slidably coupled to solenoid stator 323 and affixed to link block 330. Solenoid plunger 324 may be made of iron, or any other suitable material.

Latches 350 may each move between at least two different positions. In the latched position, each latch 350 is in contact with bottom shell 302 and a portion of each of latches 350 protrude from bottom shell 302. In the unlatched position, the latches 350 do not substantially protrude from bottom shell 302, at least not so far as to engage catches 460. As configured, each arm 340, when in compression, imparts a torque on its corresponding latch, the torque tending to rotate each of the latches 350 towards the latched position. Latch spring 370 is compressed between stator 323 and link block 330, tending to bias link block 330 away from stator 323. This, in turn, places arms 340 in compression, tending to rotate latches 350 with respect to bottom shell 302 towards the latched position. Bottom shell 302 ultimately prevents further outward rotation of latches 350.

With particular reference to FIGS. 15 through 18 and continued reference to FIG. 14, the interaction of the components of module 300 and receptacle 410 during insertion of module 300 will now be described. FIGS. 15 through 18 show four cross-sections of a portion of powered actuation mechanism 320, latching mechanism 349, lip 450, and catch 460. Each cross section represents a different point during insertion of module 300 into receptacle 410. The act of insertion may begin with module 300 outside receptacle 410. In the position where no forces external to module 300 act on latches 350, latches 350 are in the latched position. As discussed above, latch spring 370 biases each of latches 350 into the latched position when no outside forces act on latches 350. In the first step of insertion, module 300 is translated forward towards and into receptacle opening 470 (FIG. 11). Continued insertion engages tabs 485 (FIG. 12) of receptacle 410 with channel 395 (FIG. 13) of module 300, locating module 300 vertically and substantially constraining module 300 about all three axes of rotation and the y and z axis of translation.

Figures 15, 16:
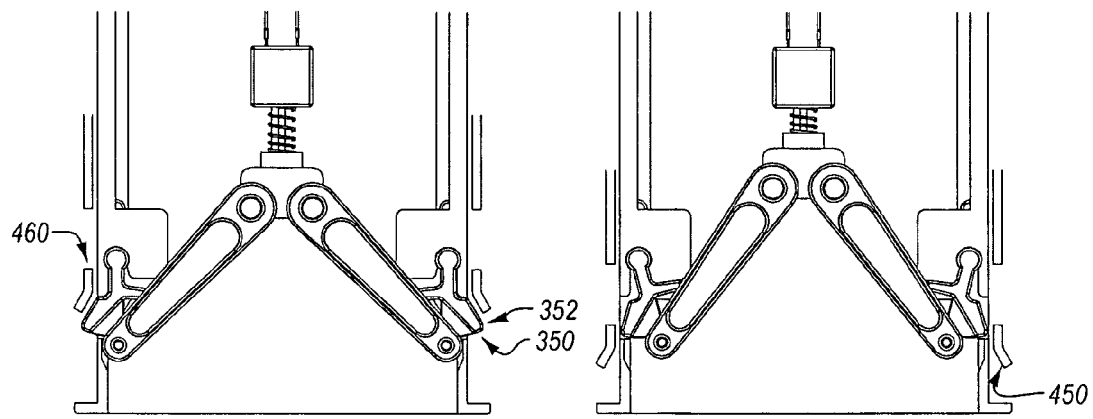
FIG. 15 is a top view of an example powered actuation mechanism and an example latching mechanism in the free state.
FIG. 16 is a top view of an example powered actuation mechanism and an example latching mechanism in a state in which two latches are being depressed by a portion of a receptacle.

Eventually, the latch ramp 352 (FIG. 14) on each of the latches 350 contacts lip 450 of the receptacle, as shown in FIG. 15. Continued insertion causes lips 450 to rotate latches 350 towards the unlatched position, thereby moving the link block 330 forward, thereby compressing latch spring 370, as shown in FIG. 16. After latches 350 pass lips 450, each latch 350 passes its corresponding catch 460, where the action of latch spring 370 rotates latches 350 towards a latched position until latch 350 contacts bottom shell 302, as shown in FIG. 17.

Figures 17, 18:
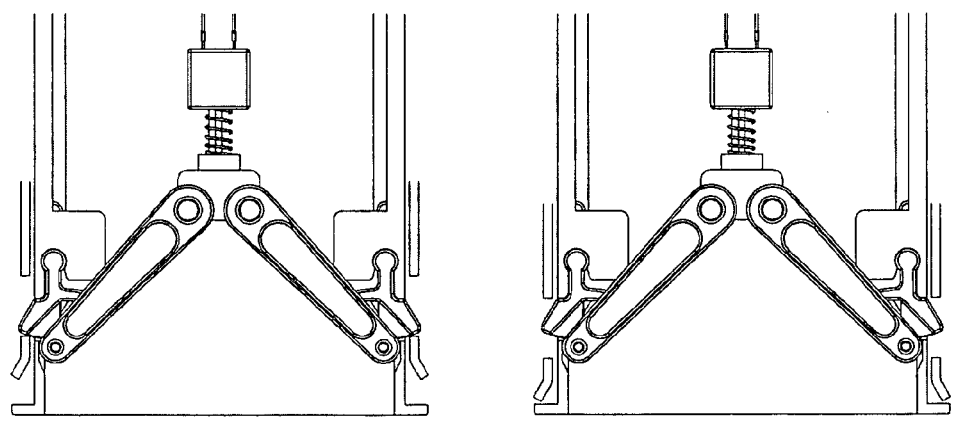
FIG. 17 is a top view of an example powered actuation mechanism and an example latching mechanism in a latched state.
FIG. 18 is a top view of an example powered actuation mechanism and an example latching mechanism in an over-travel position.

Module 300 may be configured to allow insertion of module 300 to continue for some distance past the point at which latches 350 engage catches 460 to an "over-traveled" position, as shown in FIG. 18. Where an ejection mechanism is provided, releasing module 300 from the over-travel position results in the ejection mechanism moving module 300 backward to the point where latch surfaces 354 of the module 300 contact catches 460. Where no ejection mechanism is provided, as is this case with this particular example, releasing module 300 from the over-traveled position will not generally result in any movement of module 300 with respect to receptacle 410. In this case, the operating positions of module 300 range from the latch engagement position to the over-travel position.

The ejection of module 300 from receptacle 410 will now be described. Ejection may occur when module circuitry 390 provides an electrical input to powered actuation mechanism 320. In this example, the electrical input may comprise electrical current supplied to solenoid stator 323. In response, solenoid stator 323 may impart a force in the forward direction on the link block 330, causing link block 330 to move forward with respect to other portions of module 300. Link block 330's forward motion places arms 340 in tension, thereby imparting a torque on latches 350, causing latches 350 to rotate from the latched position to the unlatched position. The motion of solenoid plunger 324 and arms 340 is stopped when the travel of solenoid plunger 324 is stopped by a stop internal to solenoid stator 323.

Latches 350 may be configured so that when latches 350 are in the unlatched position, they are in a position where they cannot engage catch 460. Where an ejection mechanism is provided, the disengagement of latch 350 from catch 460 may result in a backward movement of module 300 with respect to receptacle 410. In that case, module processing circuitry 390 may need only to actuate powered actuation mechanism 320 for just enough time to ensure that ejection mechanism 440 moves module 300 far enough back to ensure that latch 350 is behind catch 460. Where necessary, drag members (not shown) of module 300 may provide friction by rubbing against receptacle 410, thereby preventing ejection mechanism 440 from ejecting module 300 completely. Or, optionally, drag members may be included with receptacle 410. From a partially-ejected position, module 300 may be manually extracted from receptacle 410.

Where there is no ejection mechanism, module 300 does not generally move when latches 350 are moved from the latched position to the unlatched position. In that case, module 300 may be extracted manually once module processing circuitry 390 actuates the powered actuation mechanism 320. Module processing circuitry 390 may be configured to provide current to powered actuation mechanism 320 for a longer time, for example, 20 seconds, to allow sufficient time for module 300 to be manually pulled backwards to a position where latch 350 is behind catch 460.

The relevant parts of module 300 may be assembled as follows. An assembly comprising the connection leads 322, stator 323, plunger 324, and link block 330 may be provided. This assembly may be affixed to PCB 318 by solder, epoxy, or any other suitable method. Connection leads 322 may be affixed to appropriate connections on PCB 318 by solder, or any other appropriate means. Latches 350 may then be assembled to bottom shell 302 by translating latches 350 downward to a position where latch pivot 355 of each latch 350 engages pivot cavity 305 of bottom shell 302. Next, arms 340 are translated downward, thereby coupling arms 340 and link block 330 and coupling arms 340 to their corresponding latch 350. Finally, top shell 301 is translated downward and affixed to bottom shell 302 by screws 309, thereby constraining the assembly vertically.

EXAMPLE 3

Figure 19:
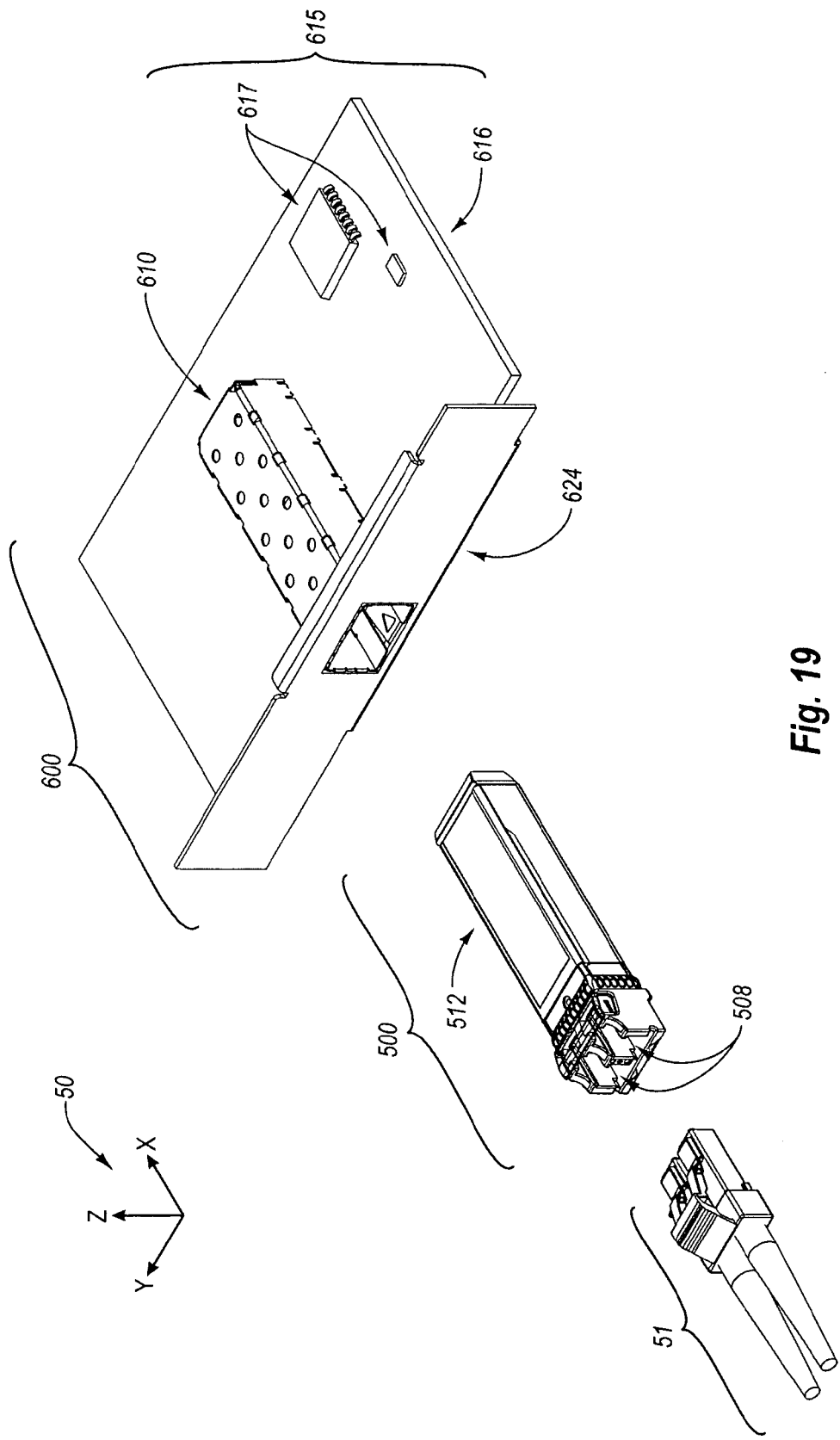
FIG. 19 is a perspective view of an example module, an example host device, and example optical cables.

FIG. 19 shows module 500 and a portion of host device 600, comprising receptacle 610. Module 500 may be a transceiver that is substantially compliant with the SPF+, SFF, or XFP standardization agreement, although other multi-source agreements are contemplated. Module 500 may comprise body 512, configured so as to allow at least partial insertion of module 500 into receptacle 610. Thus, module 500 may be insertable into receptacle 610, securable therein, and extractable therefrom. Module 500 may be configured to accept one or more optical cables 51 into cable ports 508. Axes 50 may define directions w/respect to receptacle 610. Host 610 may also comprise host circuitry 615, which may comprise PCB 616 and associated host processing components 617. Finally, host 610 may comprise faceplate 624, which may be shared with other receptacles.

Module 500 is in many respects similar to module 100. Therefore, the following discussion will assume that the reader is familiar with the information taught with respect to module 100 in example 1, avoiding duplication where practical.

Figure 20:
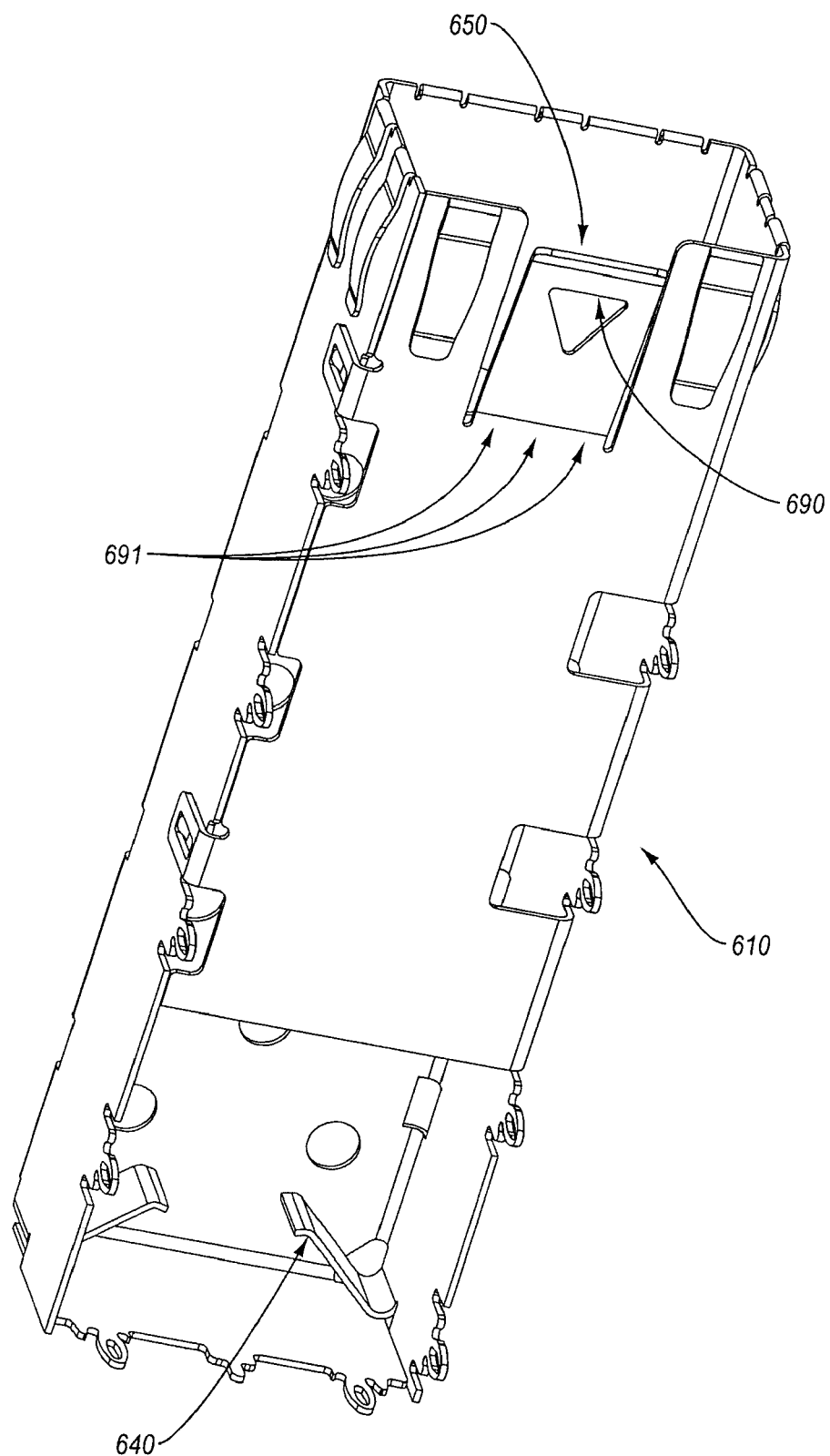
FIG. 20 is a perspective view of an example receptacle cage.

FIG. 20 shows receptacle 610, which may be identical or similar to receptacle 210. With respect to module 500, however, a portion of receptacle 610 may perform a different function, necessitating different nomenclature. Specifically, with respect to module 500, receptacle 610 comprises a latch 690. Latch 690 of receptacle 610 is similar or identical to catch 260 of receptacle 210. The reason that the shift in nomenclature is necessary will become apparent below. Receptacle 610 may comprise eject mechanism 640, similar or identical to eject mechanism 240 of receptacle 210.

Figure 21:
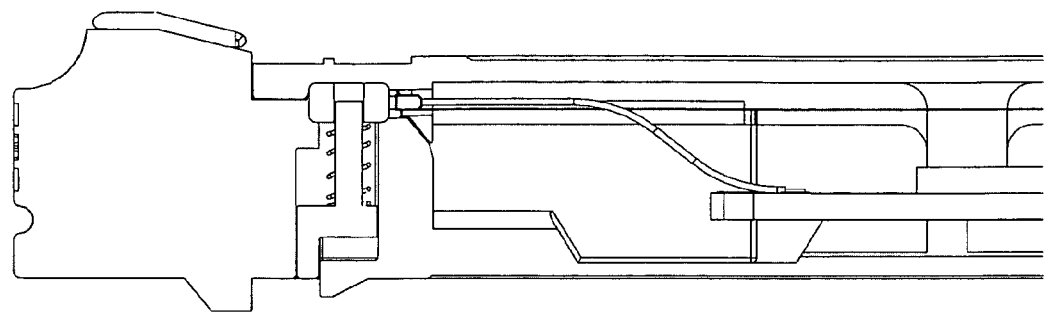
FIG. 21 is a section view of an example module showing an example powered actuation mechanism and an example latching mechanism.

FIG. 21 shows a cross section of module 500, detailing, among other things, latching mechanism 549. Latching mechanism 549 may comprise a pusher spring 562, pusher 561, and catch 560. Pusher spring 562 may be tensioned between solenoid stator 523 (discussed below) and pusher 561, biasing solenoid plunger 524 upward towards top shell 501. That is, pusher spring 562 may operate as, among other things, a means for biasing pusher latch 150 towards a non-pushing position. When no outside force acts on pusher 561 and solenoid stator 523 is not powered, pusher spring 562 may cause solenoid plunger 524 to bear into solenoid top shell 501. Pusher 561 may be cast of zinc, molded from a polymer, or made any other suitable way. Pusher 561 and plunger 524, discussed below, may be provided separately or as an integral piece. Catch 560 protrudes downward from module 500, but is substantially stationary with respect module 500. Catch 560 may be provided as a separate piece from bottom shell 502, or may be integrated therewith, as shown in FIG. 21.

FIG. 21 also shows powered actuation mechanism 520, comprising solenoid stator 523, solenoid plunger 524, and connection leads 522. Solenoid stator 523 may be affixed to top shell 501 by epoxy, any suitable adhesive, a fastener, or any other suitable manner. Pusher 561 may be provided with a hole in which plunger 524 is inserted. Plunger 524 may be connected to pusher 561 by adhesive, or any other suitable means including, but not limited to, screw threads and soldering. Powered actuation mechanism 520 may be configured as a means for actuating the latching mechanism, in a way described below.

With particular reference to FIGS. 22 through 25, and continued reference to FIG. 21, the interaction of the components of module 500 and receptacle 610 during insertion will now be described. The act of insertion may begin with module 500 outside of receptacle 610. At this stage, plunger 524 may be biased against top shell 501 and pusher 561 may be substantially subflush the exterior plane of bottom shell 502.

Figure 22:
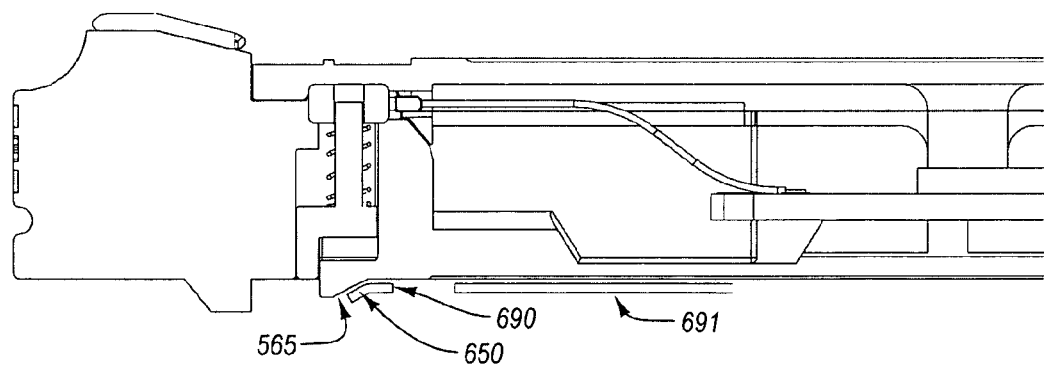
FIG. 22 is a side section view of an example powered actuation mechanism and an example latching mechanism in the free state.
Figure 23:
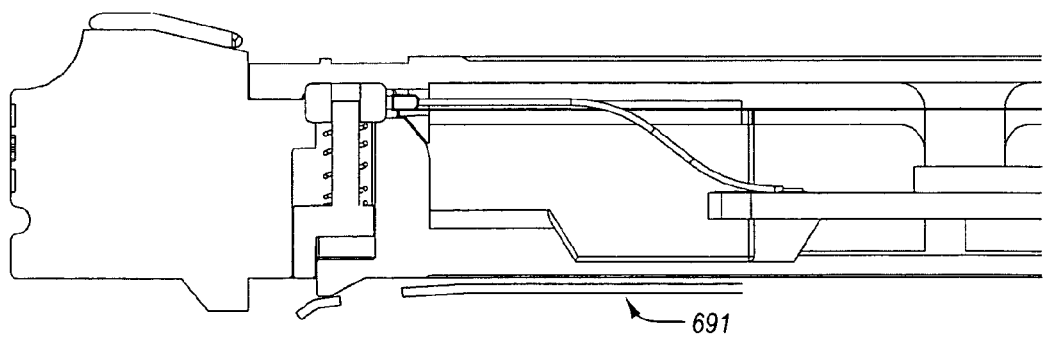
FIG. 23 is a side section view of an example powered actuation mechanism and an example latching mechanism in a state in which a module catch is deflecting a latch away from the module.
Figure 24:
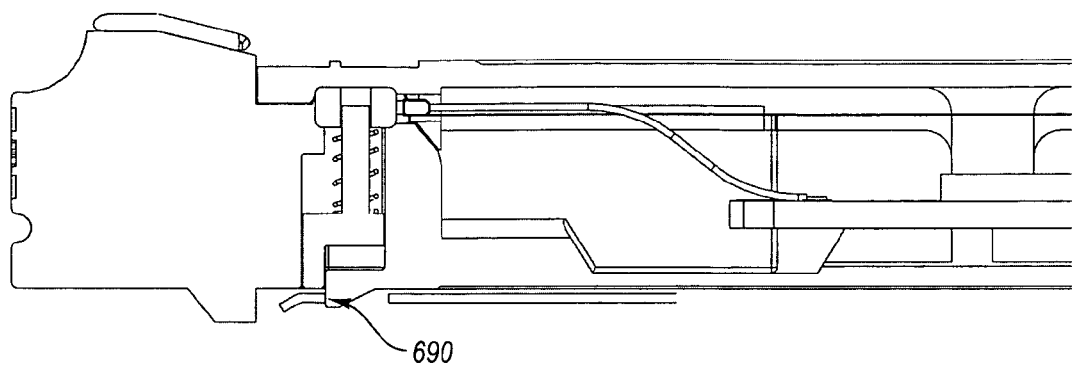
FIG. 24 is a side section view of an example powered actuation mechanism and an example latching mechanism in a latched state.

Insertion of module 500 into receptacle 610 may cause lip 650 (FIG. 20) of receptacle 610 to come into contact with catch ramp 565 (FIG. 21), as shown in FIG. 22. With continued insertion, lip 650 may interact with catch ramp 565, forcing latch 690 of receptacle 610 to move largely downward, thereby deflecting latch spring 691, which may be a cantilever spring formed from the material of receptacle 610, as shown in FIG. 23. Further translation forward brings module 500 to the operating position, where latch 690 may travel past catch 560, at which point latch 690 substantially translates up, allowing catch 560 and latch 690 to mutually engage, as shown in FIG. 24. Module 500 and receptacle 610 may be configured so as to allow over-travel in a way similar to that described with respect to module 100 and receptacle 210.

Figure 25:
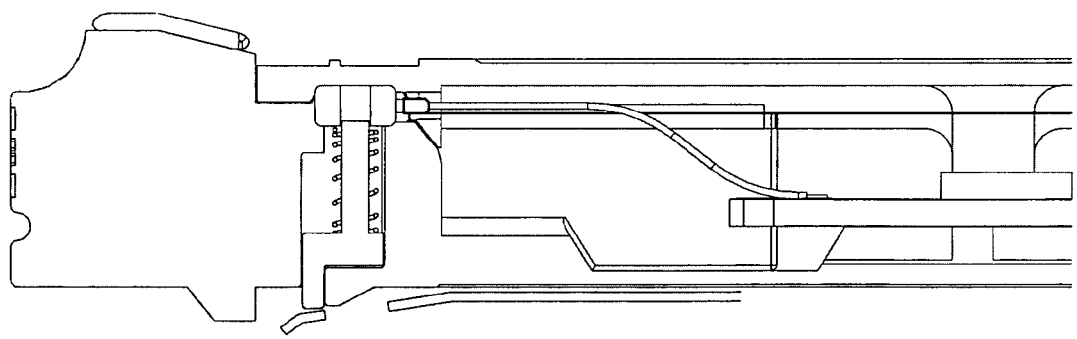
FIG. 25 is a side section view of an example powered actuation mechanism and an example latching mechanism in the process of ejection.

Module 500 may be ejected from receptacle 610. To perform an ejection, module processing circuitry 590 may deliver an electrical input to the powered actuation mechanism 520. In the present example, the electrical input may be a current delivered to solenoid stator 523, thereby causing solenoid stator 523 to impart a downward actuation force to plunger 524. This actuation force causes plunger 524 to bias pusher 560 downward, as shown in FIG. 25. Pusher 560 then contacts latch 690, and moves latch 690 downward until latching surface 690 disengages catch 560 of module 500. Thus, in all three examples, the latch is the portion of the mechanism that moves to disengage the catch during an ejection. Ejection mechanism 640 may then partially eject module 500 from receptacle 610. Module 500 may comprise drag members that prevent ejection mechanism 640 from completely ejecting module 500 from receptacle 610. Module 500 may then be removed completely from receptacle 610 by manually translating module 500 backwards.

Electrical Options

In some of the examples herein, processing circuitry may provide an electrical input to a powered actuation mechanism, thereby operating a latch. In other examples herein, the processing circuitry may provide an electrical input to a powered actuation mechanism, thereby operating a pusher. In some of the examples, the electrical input was a current supplied to the powered actuation mechanism. As an alternative, the electrical input could be a voltage, or any other suitable input. In one example, the processing circuitry might comprise a printed circuit board, a microprocessor, and an amplifier. The amplifier may be necessary to provide sufficient electrical input to the powered actuation mechanism.

The host circuitry may be configured to provide the electrical input to the powered actuation mechanism in response to an unlatching signal from the host circuitry. The host circuitry may be configured to provide the unlatching signal in response to a passcode provided by a user interacting with the user interface of the host device. As an example, the user might enter the passcode on a typical computer keyboard. A passcode could be provided as a typed password, a typed passnumber, or a mixture of the two. Optionally, the passcode could be provided in response to a biometric measurement, such as, for example, from a fingerprint or retina recognition device.

The host circuitry may be configured to provide the unlatching signal as a high value on a conductor. Optionally, the host circuitry may provide a multiple bit unlatching signal and the module circuitry may respond only to a subset of the possible values of the unlatching signals. The following table describes one possible implementation:

000 Do not unlatch
001 Do not unlatch
010 Do unlatch
011 Do not unlatch
100 Do not unlatch
101 Do unlatch
110 Do not unlatch
111 Do not unlatch The unlatching signal may contain many more bits than the simplified example above for instance, 64 bits, 128 bits, or 256 bits.

In addition, the module may be configured so that the multi-bit unlatching signals to which the module responds may be changed with appropriate programming communications from the host device. For instance, the module circuitry may contain flash RAM that may store a list of possible signals to which a module might respond. The module circuitry may be configured to allow the host device to write values into that flash RAM that correspond to the values to which the module is responsive, thereby changing the unlatching signal values to which the module responds.

Other Aspects

The following paragraphs describe some optional aspects. The following discussion is not a complete enumeration of all variations possible, but rather serves to highlight some of the many variations that may be practiced. In general, these options may be practiced additionally or alternatively to the previously disclosed examples.

Some of the example modules may be compliant with various multi-source agreements that are common within the industry. Modules may optionally be compliant with other standards, or, with no particular standard.

In the ejection mechanism of some of the examples, a leaf spring may act as a biasing element, possibly biasing the latch(es) to the catch(es) and possibly partially ejecting the module when the module is unlatched. Other passive mechanical elements might provide ejection force, including, but not limited to, a coil spring, an air spring, a combination of magnets, a combination of magnets and or magnetically permeable materials, or any suitable combination thereof. The eject mechanism might optionally comprise a powered mechanism, such as for example, a solenoid or pneumatic actuator, or any other active mechanism. Finally, the ejection mechanism could be mounted on the module rather than the receptacle.

In the ejection mechanism of some of the examples, a biasing element, like a leaf spring, may have operated directly on the module. Optionally, a biasing element may work through any of numerous mechanical mechanisms, including, but not limited to a gearbox, a lever and fulcrum, or any other suitable mechanism.

In one of the examples, a latch and a powered actuation mechanism may be mounted to the module. In another example, the powered actuation mechanism may be mounted to the module and the latch may be mounted to the receptacle. Optionally, a powered actuation mechanism might be mounted on the receptacle and a latch might be affixed and/or a part of the receptacle. Or, a powered actuation mechanism might be mounted to the receptacle and a latch might be affixed and/or part of the module.

In some of the examples, a latch spring may bias the latch towards the latched position. Optionally, a latch spring may bias the latch towards the unlatched position rather than towards the latched position. In this configuration, the powered actuation mechanism might act to move the latch from the unlatched position to the latched position.

In some of the examples, a pusher spring may bias the pusher away from the latch. As an alternative, the pusher spring might bias the pusher towards the latch with sufficient force to overcome the latch spring.

In some of the examples, the module may be inserted by translation along a single axis. Optionally, a module and receptacle might be configured to rely on other insertion motions. In some cases, the latching mechanism may latch a module into a receptacle wherein the insertion motion consists of a light-bulb-like twisting motion. In some of those cases, the latch, when latched, may prevent the module from being twisted out by preventing relative circumferential movement between the module and the receptacle. As another option, the module and receptacle could be configured so that an act of insertion requires or allows two or more motions. For example, a module might be insertable into a receptacle with a combination of an initial linear motion and a subsequent rotational motion about an axis substantially perpendicular to the initial linear motion. In this example embodiment, the latch, when latched, might prevent the reversal of the subsequent rotational motion.

In some of the examples, the module might have a rectangular cross-section. Optionally, a module might have any suitable cross-section. For example, the module and receptacle may both be of the shape of a cylinder, the catch may be of the shape of a ring-shaped recess in the receptacle, and one or more latches may latch to any portion of the ring.

In some of the examples, the latches may be configured to either translate along a single axis during actuation or to rotate about a single axis during actuation. Optionally, a latch might be configured to move during actuation through more complex motions that combine multiple axes of motion. For example, a latch might be configured to move from the latched position to the unlatched position and vice versa through a combination of linear and rotational motions.

In some of the examples, the module may have communicated with the host through an electrical connection made by the module interface mated to the receptacle interface. As an alternative, a module might communicate with a host device through other modes of communication, including transmission and reception of optical signals, wireless communication, or any other suitable means of communication.

In some of the examples, the host-side communications interface may have been comprised of a set of connection pads located on the PCB. As an alternative, the module interface may be provided as a separate component from the PCB, connected thereto by conductors.

Some of the examples may include a latch spring, and in some of those examples, the latch spring force may have been applied directly to the latch. As an alternative, a latch spring could be configured to apply the latch spring force directly to the powered actuation mechanism. As another alternative, the latch spring could be configured to act on a mechanical mechanism which in turn acted on the latch, thereby providing a bias force which tended to keep the latch latched. Such a mechanism may include common mechanical transmission elements including, but not limited to, spur gears, worm gears, planetary gears, levers, pulleys, etc.

In some of the examples, the latch and the latch spring may have been provided as separate, discrete parts. In another example, the latch and the latch spring were integrated into a single physical part. Any of the elements, where it makes sense to do so, may be integrated with other elements. Such a configuration may have the benefit of reducing the number of parts, thereby reducing the cost. As another example, the latch and a portion of the powered actuation mechanism may be integrally formed.

In some of the examples, the latch spring may have been a mechanical coil spring, configured so as to compress when the latch moved from the latched position to the unlatched position. In some aspects of the invention, the coil spring may be replaced by a leaf spring, a permanent magnet spring, an electro magnet spring, or any other suitable element. Optionally, the mechanism may be configured so that the spring extends when the latch moves from the latched position to the unlatched position.

In some of the examples, a latch ramp may have contacted a lip, causing the latch to move a portion of the distance between the latched and the unlatched position, during insertion of a module. As an alternative, the latch could remain substantially stationary during insertion, and the catch might move. In those cases, the latch may still be unlatched by causing the powered actuation mechanism to move the latch with respect to the catch. In some cases, the catch may be provided with a catch spring to allow the catch to bias the catch towards a position in which it may engage the latch.

In some of the examples, the latch moves during insertion to a position somewhere between the latched and the unlatched position, then ultimately moves back to the latched position, thereby affixing the module to the receptacle. In some of these examples, the latch moves in substantially the same way during insertion as during actuation. As an alternative, the latch might move in a different direction or in a different way during insertion than during actuation. For instance, the latch and receptacle might be configured so that the latch moves left or right during insertion but up or down during actuation. As another alternative, the latch and receptacle may be configured so that the latch rotates during insertion, but translates actuation.

In some of the examples, connection wires may electrically connecting various components together. For instance, in some of the examples, electrical wires may connect a powered actuation mechanism to a processing circuitry. As an alternative, a powered actuation mechanism could be connected through other means, including, but not limited to, a flexible circuit, wirelessly, or by directly soldering a portion of the powered actuation mechanism to a PCB.

In some of the examples, the module may be an optoelectronic transceiver module. In another example, the module may have been an optoelectronic transponder module. As an alternative, a module might be another type of module including, but not limited to, electronic transceiver modules, electronic transponder modules, and wireless communication modules.

One of the examples may employ one latch to retain the module into the receptacle. Another example may employ two latches to retain the module into the receptacle. As an alternative, three or more latches might be used to retain a module within a receptacle. These implementations may be desirable in some situations requiring greater module retention force.

In some of the examples, the module insertion and extraction process may be described as being performed by a person. The module insertion and extraction process might also be performed by other entities, including, but not limited to, machines or other mechanisms. In some aspects, the host machine itself could include machinery for manually extracting the modules.

In the powered actuation mechanism of some examples, the actuator may be a solenoid. As an alternative, the solenoid might be replaceable by other actuators including, but not limited to, a piezoelectric motor, a stepper motor, muscle wire, stepper motors, brushed dc motors, brushless dc motors, hydraulics, pneumatics, or any combination of these.

In the powered actuation mechanism of one of the examples, the actuator may be configured to operate directly on the latch. In another, the actuator may be configured to operate on the latch through a linkage connecting the actuator to the latch. In some aspects of the invention, other mechanical elements might be employed to transfer mechanical work between the actuator and the latch, including, but not limited to, a spur gear mechanism, a planetary gear mechanism, a lever mechanism, a worm gear mechanism, a rack and pinion mechanism, a wedge, a radial cam, an axial cam, a four bar linkage, or any combination of these. In some instances, employing these mechanical elements might be advantageous in that they might provide increased or decreased leverage.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A module comprising:
    a body, configured to allow at least partial insertion of the module into a receptacle of a host device;
    a latching mechanism, disposed on or in the body, configured to secure the module to the receptacle in an operating position with respect to the receptacle;
    a host-side communications interface, disposed on or in the body, configured to be capable of communicating with the host device at least when the module is in the operating position;
    an external communications interface, disposed on or in the body, configured to be capable of sending communication outside the host device, receiving communication from outside the host device, or both;
    a powered actuation mechanism, disposed on or in the body, configured to actuate the latching mechanism; and
    module circuitry, disposed on or in the body, configured to supply an electrical input to the powered actuation mechanism, thereby actuating the latching mechanism, and further configured to carry information between the host-side communications interface and the external communications interface.

2. The module of claim 1, wherein the latching mechanism comprises a latch, the latch configured to engage a catch of the receptacle, the latch moveable with respect to the module body, the engagement of the latch to the catch of the receptacle capable of securing the module to the receptacle.

3. The module of claim 1, further comprising an anti-tamper feature, the anti-tamper feature configured to prevent a tool from manually disengaging the latching mechanism.

4. The module of claim 1, wherein the latching mechanism comprises a catch, the catch configured to engage a latch of the receptacle, the engagement of the catch to the latch of the receptacle capable of securing the module to the receptacle.

5. The module of claim 1, wherein the latching mechanism comprises an electronically actuated mechanical latch including a spring compressed between a solenoid stator and a latch, the latching mechanism further comprising a solenoid plunger and electrical leads providing electrical current from the module circuitry to the solenoid stator thereby imparting an upward actuation force to solenoid plunger.

6. The module of claim 1, wherein the latching mechanism comprises latches, arms, a link block, and a latch spring, wherein the latches cooperate with catches to selectively latch the module into the receptacle, wherein the latches rotatably couple to the receptacle by a latch pivot, wherein the powered actuation mechanism includes a solenoid stator, solenoid plunger and connection leads, wherein the latches move between at least two different positions, wherein in a latched position each latch is in contact with the receptacle and in an unlatched position the latches do not substantially protrude so far as to engage catches of the receptacle.

7. The module of claim 1, wherein the latching mechanism comprises pusher spring, pusher, and catch, the pusher spring being tensioned between a solenoid stator and the pusher, the powered actuation mechanism including the solenoid stator, solenoid plunger.

8. The module of claim 2, wherein actuation of the powered actuation mechanism is capable of at least causing the latch to disengage from the catch.

9. The module of claim 8 wherein the latching mechanism further comprises means for biasing the latch towards a latched position.

10. The module of claim 9 further comprising a second latch, the second latch configured to engage a second catch of the receptacle, actuation of the powered actuation mechanism capable of at least causing the second latch to disengage from the second catch.

11. The module of claim 1, wherein the module is configured to supply the electrical input to the powered actuation mechanism in response an unlatching signal provided by the host device.

12. The module of claim 11 wherein the unlatching signal contains multiple bits, the module actuating the powered actuation mechanism in response to only a subset of the possible values of the unlatching signals.

13. The module of claim 12 wherein the set of values of the unlatching signal to which the module is responsive is changeable through communications from the host device to the module.

14. The module of claim 4, wherein the latching mechanism further comprises a pusher, the pusher configured to transfer motion from the powered actuation mechanism to the latch of the receptacle.

15. The module of claim 14, wherein the actuation of the powered actuation mechanism is capable of causing the latch to disengage from the catch.

16. The module of claim 15 wherein the latching mechanism further comprises means for biasing the pusher away from the latch.

17. The module of claim 3, wherein the anti-tamper feature includes a protrusion of a bezel of the module that blocks insertion of a tool into a space between a receiving cavity of the receptacle and the module.

18. A module comprising:
    a body, configured to allow at least partial insertion of the module into a receptacle of a host device;
    a host-side communications interface, disposed on or in the body, configured to be capable of communicating with the host device at least when the module is in an operating position;
    an external communications interface, disposed on or in the body, configured to be capable of sending communication outside the host device, receiving communication from outside the host device, or both;
    means for latching the module into the receptacle of the host device in the operating position; and
    means for disengaging the latching means in response to an unlatching signal provided to the module by the host device.

* * * * *